May 18, 1943. J. H. BESSER 2,319,291
MOLD BOX
Filed June 10, 1939 2 Sheets-Sheet 1
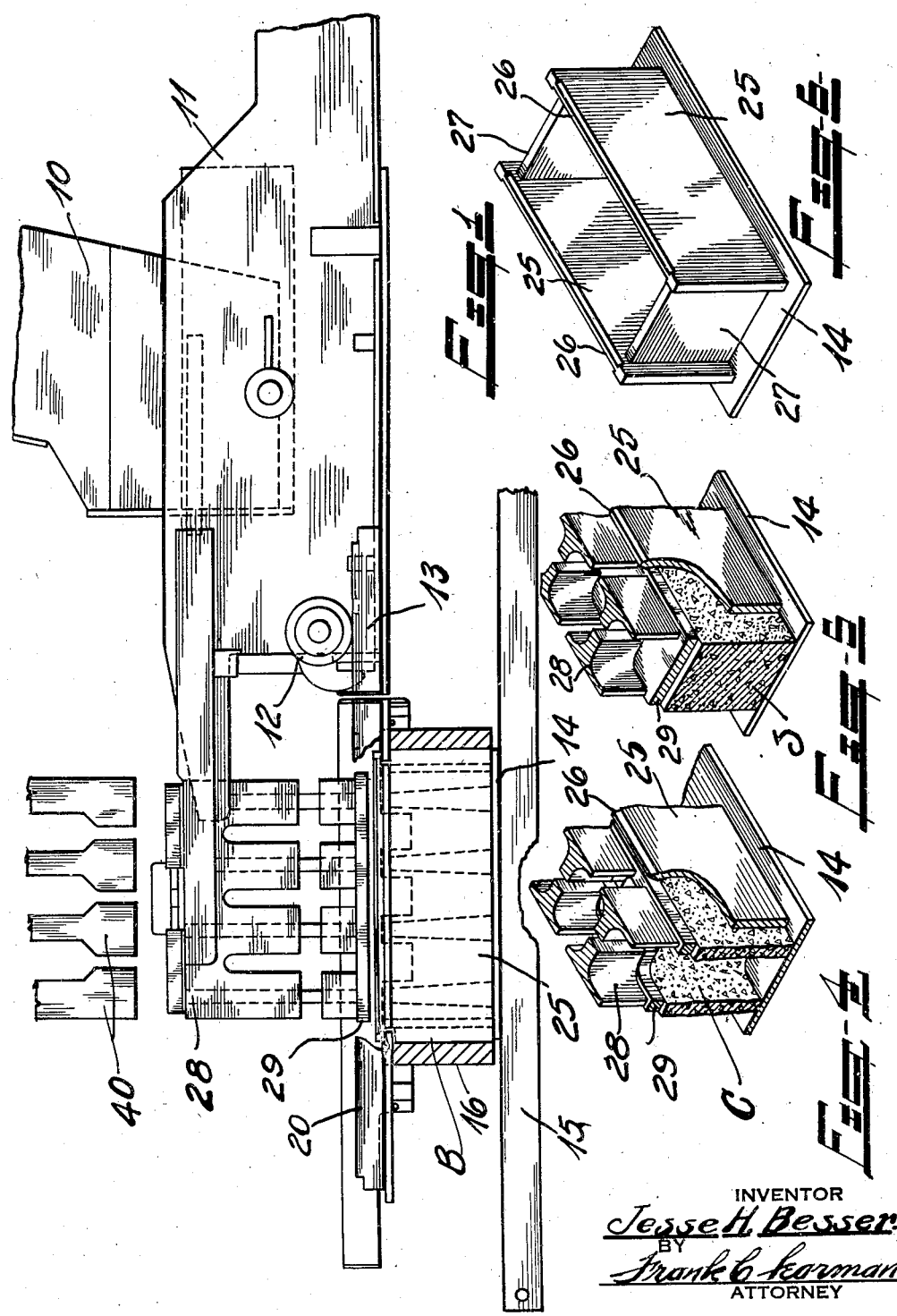
INVENTOR
Jesse H. Besser
BY
Frank C. Yearman.
ATTORNEY

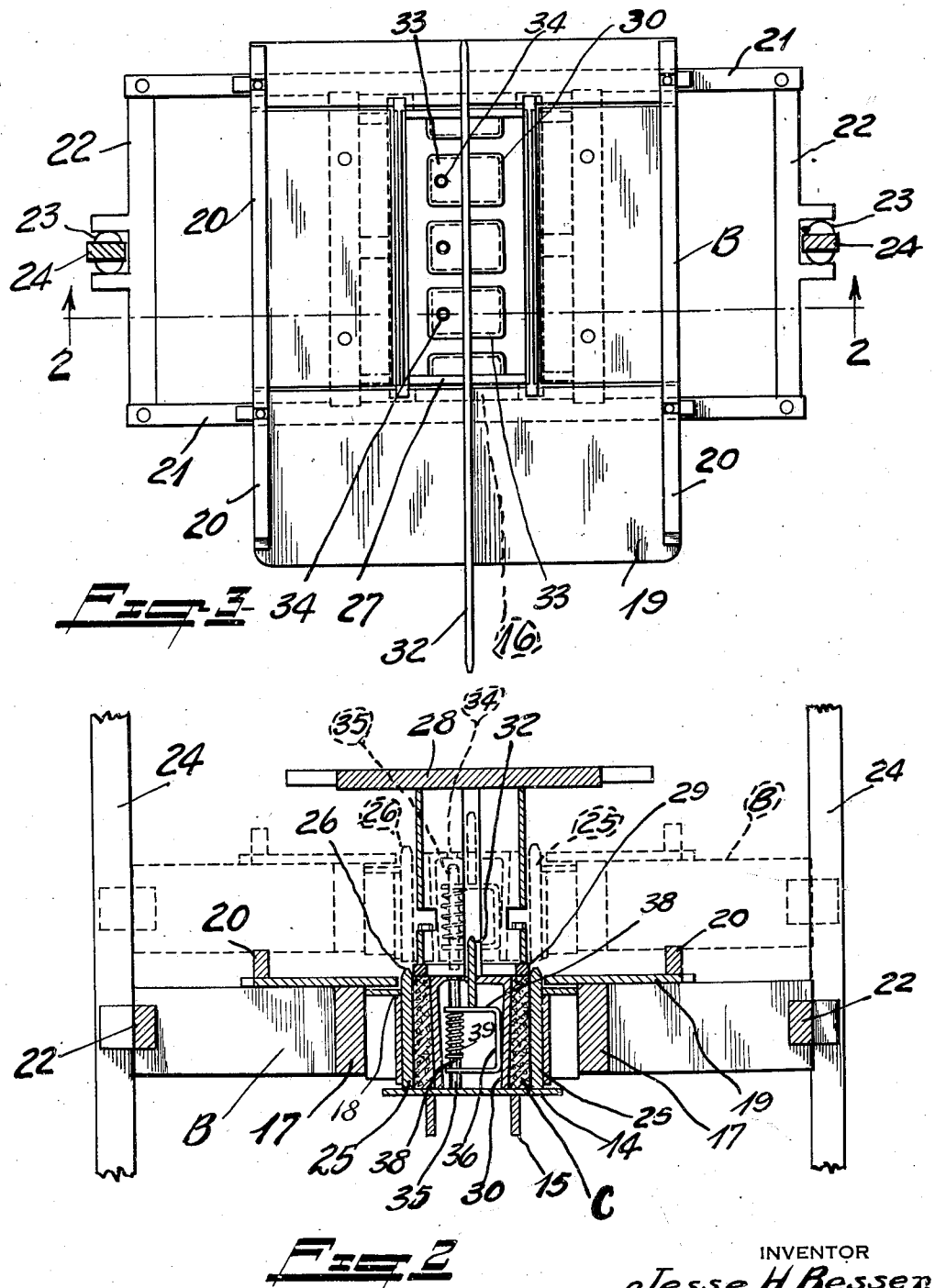

Patented May 18, 1943

2,319,291

UNITED STATES PATENT OFFICE 2,319,291

MOLD BOX

Jesse H. Besser, Alpena, Mich.

Application June 10, 1939, Serial No. 278,521

4 Claims. (Cl. 25—121)

The present invention relates to mold boxes for molding blocks or other cement, concrete or clay products of the size and shape required for buildings, walls, and/or structures of any desired nature.

One of the prime objects of the invention is to design a mold unit having projecting face liners for centering and guiding the stripper shoes, so that fully pressed molded units can be secured.

Another object of the invention is to provide a mold box by means of which the top or upper face of the block can be fully pressed, thus forming a smooth uniform product with sharp, clean corners and edges.

A further object is to provide means for guiding the stripper shoes of the machine with relation to the unit, so that full contact with the unit is obtained, thus insuring a uniform, solid block with a clean, smooth face with sharp corners.

A still further object is to provide a method and arrangement of the molds which permit the stripper shoe guiding means to be mounted, so that the top of the unit may be struck off lengthwise of the block unit without interference or hindrance from said guiding means.

A further object still is to provide simple, practical and effective means for automatically releasing the suction created in the unit when the cores are withdrawn.

With the above and other objects in view, the present invention consists in the combination and arrangement of parts, hereinafter more fully described, illustrated in the accompanying drawings, and more particularly pointed out in the appended claims, it being understood that changes may be made in the form, size, proportions, and minor details of construction, without departing from the spirit, or sacrificing any of the advantages of the invention.

In the drawings:

Fig. 1 is a fragmentary side elevational view of a block molding machine showing the hopper, feed box, stripper and mold.

Fig. 2 is a sectional front elevational view taken on the line 2—2 of Fig. 3, the broken lines showing the mold box and cores in raised position.

Fig. 3 is a top plan view of the assembly shown in Fig. 2 with the stripper omitted.

Fig. 4 is an isometric view showing a pressed block mounted on a pallet with the stripper in position, the side liners being broken away to more clearly show the construction.

Fig. 5 is a view similar to Fig. 4 and showing a solid, pressed block.

Fig. 6 is an isometric view of the mold and pallet.

Referring now more particularly to the drawings, in which I have illustrated my invention, the numeral 10 indicates a suitable hopper, which communicates with a mixer (not shown) and in which the material is mixed prior to being molded into block units of required shape and size. This hopper opens into a feed box 11, provided with rollers 12 on the side walls thereof, which rollers are mounted on tracks 13 for supporting the feed box as it is reciprocated in the usual manner, all as shown and described in Patent #1,699,218 granted to me under date of January 15, 1929.

In the accompanying drawings, I have shown the mold and block units resting on an imperforate pallet 14, which is carried on a pallet carrier 15, the mold box "B" being adapted for vertical travel toward and away from the pallet, as indicated in broken lines in Fig. 2 of the drawings, said mold box comprising end and side members 16 and 17 respectively, suitably connected to the framework 18 to form a rigid structure which is covered by a top plate 19 on which the tracks 20 are mounted in any desired manner.

Transversely disposed members 21 also form part of the mold box "B," the projecting ends being connected by longitudinally disposed member 22, including shoes 23, which shoes slidably engage the vertical guides 24, and which form a part of the machine, thus guiding the mold box as it is lifted vertically, either away from a completed block unit "C," or into position for receiving moldable material therein from the feed box.

Within the side walls of the mold box there is provided spaced apart, thin strips or face liners 25, the upper edges of which are beveled as at 26, and for a purpose to be presently described. End liners 27 are provided at the ends of these side plates, these end and side plates are welded or otherwise secured together and to the mold box in any approved manner to form a mold of desired shape and size.

When the mold is in material receiving position, these side and end liners 26 and 27 rest on the imperforate pallet plate 14, the end liners being just equal to the height of the finished block unit, while the side liners project above the end liners and serve to guide the stripper head 28 as it engages with the upper face of the material in the mold. This stripper head being mounted on the feed box 11 and is movable horizontally therewith.

The taper on the upper edges of the side liners 25 make it possible to use closer fitting stripper shoes 29, because the shoes are guided into place by the projecting face liners. This close fit insures pressing the concrete alongside the projecting face liners and over the entire face area of the molded unit, thus insuring a clean, sharp corner on the block unit.

In making hollow cored blocks, such as shown in Fig. 4 of the drawings, a core 30 is provided in the core box, said core being of proper dimensions to snugly fit the core box and is suspended from the top plate 19 by means of a core holder 32 which is welded thereto.

The cores 30 of which there are as many as there are to be hollow openings in the block unit, have open bottoms and closed upper ends 33 and move with the core box, and it will be obvious that when the molded material was tamped in the mold, that a suction would be set up in said mold, which suction would have a tendency to distort and collapse the molded unit when the core was withdrawn, and I, therefore, provide a relatively small opening or port 34 in the upper end of the core to permit entrance of air thereto or therefrom, these openings being normally closed by means of plungers 35, which are mounted in brackets 36 secured to the side wall of the interior of the mold.

The inwardly extending arms 38 of the bracket 36 are bored to accommodate the plunger 35, and a transversely disposed pin 38 is provided in this plunger at a point spaced from the lower end thereof, a coil spring 39 being interposed between said pin and the upper arm 37 of the bracket, so that when the mold and cores rest on the pallet 14, the lower end of the plunger will butt against the face of said pallet forcing it upwardly and closing the opening 34, and when the mold is raised, this spring, aided by the weight of the plunger, forces it downwardly and out of engagement with the openings 34, so that air may enter the mold and eliminate any vacuum or suction and prevent distortion of the molded block.

I wish to direct particular attention to the fact that the block mold is disposed longitudinally with relation to the machine, and this together with the projecting side liners permits the block to be "struck off" and the top face to be fully pressed, which in turn results in the production of sharp, clean and uniform edges and corners, not possible with conventional block machines at present on the market.

Preparatory to the molding operation, the mold box "B" is positioned above the pallet when the latter is in intermediate position, as the mold box moves downwardly the lower edges of the side and end liners and cores will seat on the pallet 14, with the end of the plunger 35 forced upwardly to close the opening 34 in the cores.

The feed box 11 now moves outwardly to deposit the moldable material in the mold, this automatically moves the stripper outwardly beyond the mold box so that it is out of the path of travel of the tampers 40, the moldable material is then tamped in the mold about the various core members by means of these tampers 40 in the conventional manner, and the feed box 11 then moves rearwardly on the tracks, striking off the block and moving the stripper to position directly over the mold. The stripper head 28 is now slightly above the upper edge of the mold, and as the mold moves upwardly these tapered side liners 26 serve as guides so that the stripper head accurately engages and bears on the top face of the molded block, fully pressing the top to form sharp, clean corners and edges, the mold box "B" continues its upward travel on the guides 24 to clear the molded block, the springs 39 opening the ports 34 to admit air to the cores, and the pallet with the block thereon is then pulled forwardly on the pallet carrier 15 from which it is taken and transported to a suitable curing yard or shed. In the meantime, another pallet 14 is manually or mechanically positioned on the carrier 15 and the cycle is repeated.

In Fig. 5 of the drawings I have shown a solid block unit "S," and when manufacturing solid blocks the stripper shoes 29 will be solid, and the cores 30 are, of course, omitted, the operation, however, is exactly the same.

From the foregoing description, it will be obvious that I have perfected a very simple, practical and economical mold unit for molding concrete and/or clay products of all kinds.

What I claim is:

1. A mold having side and end walls, the upper edges of the side walls extending a predetermined distance above the end walls, cores open at the lower ends supported in said mold, a pallet forming a support for said walls and a closure for the lower open end of the cores, and means for admitting air into said cores during the removal of the cores from the moulded unit.

2. A mold having side and end walls, cores open at the lower ends supported in said mold, an imperforate pallet forming a support for said walls and a closure for the lower open ends of the cores, an opening in the top of said cores, and means butting against said pallet to close said openings when the core rests on the pallet, said means uncovering said openings when the moulded units are being removed.

3. A mold having side and end walls, cores open at the lower ends suspended in said mold and formed with closed top and an open bottom, an imperforate pallet forming a support for the walls, and a closure for the lower open ends of the cores, an opening in the top of the cores, plungers mounted in the cores with their lower ends butting against the pallet and their upper ends closing said openings, and resilient means for shifting said plungers to uncover said openings when the molded units are being removed.

4. A mold having side and end walls, cores open at the lower ends supported in said mold, a pallet associated with said walls and core and forming the bottom of the mold when said cores are positioned in the mold, openings in the top of the cores, plungers mounted in said cores with their lower ends in engagement with the pallet, and their upper ends forming a closure for the openings in the core, and means for automatically shifting said plungers to uncover said openings when the molded units are being removed.

JESSE H. BESSER.